United States Patent [19]
Johansen

[11] 3,981,069
[45] Sept. 21, 1976

[54] RANGE-HOOD ELECTRICAL WIRING CONNECTION ARRANGEMENT AND METHOD OF CONNECTING SAME

[75] Inventor: Robert J. Johansen, Glendale Heights, Ill.

[73] Assignee: Aubrey Manufacturing, Incorporated, Union, Ill.

[22] Filed: Apr. 10, 1975

[21] Appl. No.: 566,738

[52] U.S. Cl. ................................. 29/526; 29/624; 98/115 K; 126/299 B; 174/51; 174/65 R; 174/78

[51] Int. Cl.² .................... B23P 19/00; H05K 5/02; H05K 15/02

[58] Field of Search ............... 29/526, 624; 174/51, 174/65 R, 78; 285/158, 161, 189; 126/299 B; 98/115 R, 115 K

[56] References Cited
UNITED STATES PATENTS

| | | | |
|---|---|---|---|
| 1,860,800 | 5/1932 | Borden | 285/161 |
| 2,131,165 | 9/1938 | Clements | 174/65 R |
| 2,265,179 | 12/1941 | MacDonald | 285/161 |
| 2,309,741 | 2/1943 | Woodward | 174/65 R X |
| 2,667,368 | 1/1954 | Ferguson | 174/65 R X |
| 2,730,381 | 1/1956 | Curtiss | 285/161 X |
| 2,893,305 | 7/1959 | Jenson et al. | 126/299 B UX |
| 2,993,428 | 7/1961 | Wermager | 98/115 K |

*Primary Examiner*—Charlie T. Moon
*Attorney, Agent, or Firm*—Alter and Weiss

[57] ABSTRACT

A range-hood electrical wiring connection arrangement for use on canopy type range-hoods to facilitate one-man installation of the electrical power link-up. The incoming power cable is first mechanically coupled to a connection device and then the connection device is attached to the range-hood.

11 Claims, 8 Drawing Figures

RANGE-HOOD ELECTRICAL WIRING CONNECTION ARRANGEMENT AND METHOD OF CONNECTING SAME

BACKGROUND OF THE INVENTION

The present invention relates generally to household appliance fixture installation devices and more particularly to range-hood electrical connection arrangements which provide portal disk devices for preliminary mechanical connection of power cables before the cables are finally attached to range-hood assemblies.

Over the last several years, the use of canopy type range-hoods has increased in both house and apartment usage to the extent that the range-hood is no longer seen as a frivolous luxury but rather as a necessary kitchen accessory.

With the expanded usage of the range-hood as a necessary kitchen appliance for the exhausting of smoke and vapor filled air, or in the case of ductless range-hoods through which the air is re-filtered and exhausted back into the cooking area, means have been sought for facilitating electrical connections of such range-hoods. In the past, the incoming power circuitry to the hoods would often have to be attached while maintaining the range-hood assembly in a fixed position against a wall or soffit and simultaneously mechanically and electrically connecting the power cable directly to the range-hood assembly.

While many mechanical cable attachment devices have been developed over the years, few, if any, have addressed themselves to the preliminary wiring connection of a relatively large wall or soffit mountable appliance fixture so as to simplify the electrical wiring and mechanical attachment of the power cable to the fixture, as well as the attachment of the grounding wire.

One example of the prior art in the area of facilitated wiring connection is the use of the pre-wired recessed lighting housings used with recessed lighting fixtures. The pre-wired recessed housings were developed years ago to enable an installer of such a lighting fixture to quickly and easily connect ceiling wiring to the fixture without having to connect the abode's wiring directly into a fixture housing with conventional connectors. The pre-wired housing consists of a BX cable assembly fabricated directly to a housing, enabling the installer to simply connect two leads emanating from the outside of the pre-wired housing to the two leads exposed behind the fixture. The pre-wired assembly provides an already attached incoming circuitry device, consisting of sheathed flexible armored cable, which had been pre-coiled and attached to the outside of the fixture housing, protruding into the housing itself and terminating with a rigidly attached socket device so that after completion of the preliminary wiring attachment outside the housing assembly, no incoming leads had to be affixed directly to the housing container, since the secure incoming lead placement was already pre-attached to the housing.

Before the use of such pre-wired recessed lighting housing devices, an installer would have to feed the abode's emanating cable through an orifice located on the housing box itself, secure this incoming cable fixedly to the housing through the use of BX connectors or other various securing devices, and then wire the emanating leads of the incoming cable to the leads coming off of the socket assembly within the housing itself. The pre-wired device eliminates the need for electrical connection within the fixture housing as well as the need to secure any incoming cable to the metallic perimeter of the housing assembly. All that is required is an initial link-up on the outside of the housing assembly through the attachment of the externally exposed housing assembly leads, to the externally exposed abode's electrical conducting means. Once this connection is made, final positioning and attachment of the recessed lighting housing is accomplished without further wiring connection, enabling the immediate use of the fixture.

Apparently, only a few relatively easy to install "electricity requiring" appliances have had devices developed to facilitate their installation by not requiring an installer to directly affix the abode's wiring leads to the appliances, but rather to a preliminary attachment connection device, to which a grounding wire can be attached, and then finally to the appliances. The industry is still searching for means for facilitating the actual installer's effort on fixtures such as range-hood assemblies which are more cumbersome, and thus more difficult to simultaneously wire, ground, and position manually.

Accordingly, it is an object of the present invention to provide preliminary link-up means for simplifying and facilitating the installation of range-hood assemblies by preliminarily attaching an abode's power lines and external armored sheathing or conducting means, as well as a grounding means, to a preliminary link-up device. This installation procedure makes it totally unnecessary to hold the entire range-hood assembly in position while simultaneously connecting the hood to electrical power lines. The preliminary connection device affords a preliminary link-up which is finally attached to the range-hood assembly with the electric cable already attached and grounded.

Attachment of the pre-wired portal disk is accomplished by the installer, through the hinging and pivoting of a first side of the disk while the second side is secured through the use of a fastener device.

It is therefore the over-all object of the present installation device to allow successful, secure, and attractive electrical connection of an abode's electrical conducting means to the manufacturer's range-hood with little effort and in minutes from the time the range-hood is unpacked to the time it is ready for functional use over a cooking area.

SUMMARY OF THE INVENTION

The present invention is an electrical wiring, connection device which facilitates the attachment, grounding, and final power link-up of the power cable of a house to a fixture assembly, so as to provide electrical power, for example, to the hood assembly's blower and lighter units. The connection device is comprised generally of (1) preliminary link-up means such as a metallic portal disk to which the abode's electrical conducting means are mechanically attached and secured by cable connecting or wire connecting devices, and to which the grounding wire is fastened, (2) the necessary orifice configuration and knock-out portion on the range-hood assembly which enables insertion of the exposed electrical leads into the range-hood assembly for final coupling as well as the mechanical attachment of the portal disk device securely restraining the incoming power cable, and (3) the means by which this portal disk-wiring unit is finally secured to the top panel of the range-hood.

This will allow the installer to affectuate the preliminary attachment of the abode's electrical conducting means and fastening of the abode's grounding wire to the portal disk for final attachment of the portal disk-cable unit to the range-hood assembly itself. This installation procedure makes unnecessary the more conventional practice of attaching the incoming wiring means and grounding wire securely and directly to the range-hood assembly and accomplishing the cumbersome task of simultaneously positioning the range-hood assembly for the direct attachment to take place.

DETAILED DESCRIPTION

Figure 1:
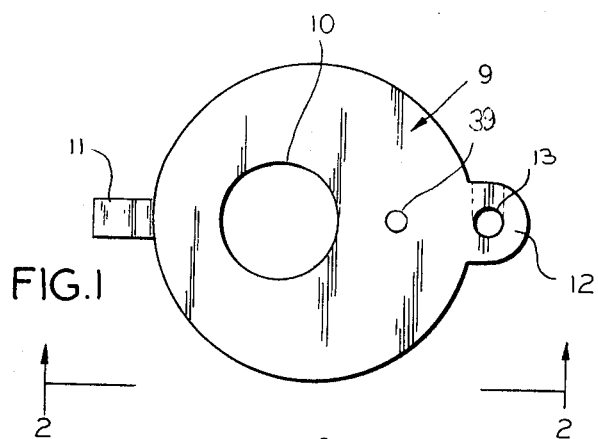
FIG. 1 is a top plan view of the metallic portal disk device.

While this invention is susceptible of embodiment in many different forms, there is shown in the drawings and will herein be described in detail, one specific embodiment, with the understanding that the present disclosure is to be considered as an exemplification of the principles of the invention and is not intended to limit the invention to the embodiments illustrated.

Figure 2:
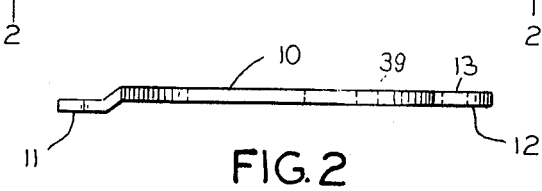
FIG. 2 is an elevational side view of the metallic portal disk device taken along lines 2—2 and looking in the direction of the arrows.

The metallic portal disk 9 through which preliminary electrical attachment is accomplished is shown in FIG. 1, with standard dimensioned aperture 10 through which a cable connector's threaded nipple is inserted, hinging latch 11 which is inserted into the top panel of the range-hood assembly to affix one side, and semi-circular appendage 12 with fabricated orifice 13 so as to allow insertion of a screwing device through the orifice for final engagement of the portal disk to the top panel of the range-hood assembly. Fabricated orifice 13 can similarly have a slotted entry as shown by the dotted lines to facilitate final engagement of the portal disk. Additionally, grounding orifice 39 is shown. The side view of the same metallic portal disk device is shown in FIG. 2 highlighting the off-set fabrication of the extended hinging latch 11 which protrudes from the first side of the portal disk.

Figure 3:
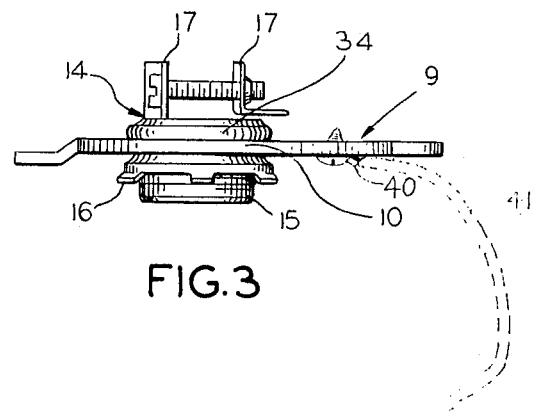
FIG. 3 is an elevational side view of the metallic portal disk device also taken along lines 2—2 and looking in the direction of the arrows, onto which a typical cable affixing connector has been fastened.

The portal disk assembly 9 is shown affixed to connector device 14 in FIG. 3. In this drawing connector device 14 has had its protruding threaded nipple appendage 15 inserted through the portal disk's standard dimensioned aperture up to the connector device's restraining neck 34 at which time locknut 16 is inserted over and tightly rotated around the protruding portion of the threaded nipple 15 until the portal disk device is sandwiched between the connector device neck 34 and the locknut 16. Ground fastening means 40 is shown inserted into the bottom side of portal disk assembly 9 attaching ground wire 41 shown in dashes.

Figure 4:
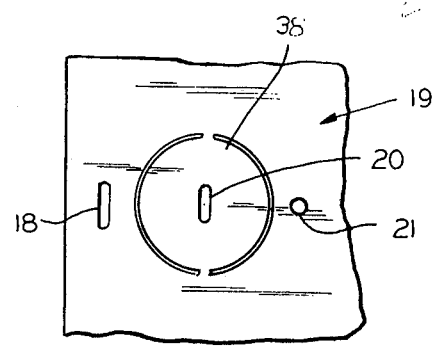
FIG. 4 is a top plan view of a portion of the top panel of the range-hood assembly showing the aperture covering knock-out and portal disk attachment orifices.

A portion of the top panel of the range-hood assembly is shown in FIG. 4 with its aperture covering means 38 comprising a fabricated stamped circular knockout, which is removable from the top panel by the insertion of the tip of a screwdriver through slotted opening 20. Upon insertion and pivotal twisting of the screwdriver the aperture covering means knock-out is removed, exposing a circular aperture in the location where the aperture covering knock-out 38 was previously located before removal. Attachment orifices are also shown in FIG. 4 with attachment orifice 18 fabricated so as to receive the hinged offset portion of the metallic portal disk, and orifice 21 threaded to align, engage and allow the insertion of a screwing device so as to maintain final secure restraint of the portal disk device against the aperture in the top panel of the range-hood assembly.

Figure 5:
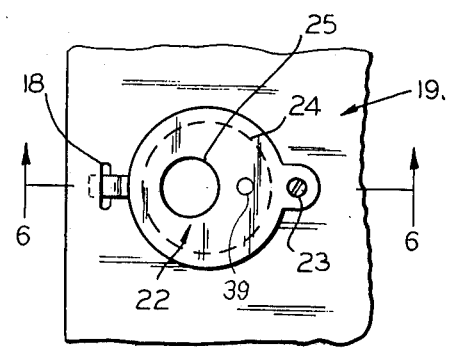
FIG. 5 is a top plan view of the top panel of the range-hood assembly showing the portal disk device in placement over the exposed aperture when the aperture covering means is removed.
Figure 6:
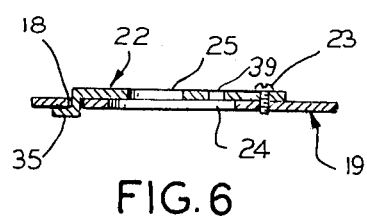
FIG. 6 is a side elevational view of the portal disk device attached to the top panel of the range-hood assembly taken along lines 6—6 and looking in the direction of the arrows.

The secure and juxtaposed mounting of the portal disk unit onto the top panel of the range-hood assembly 19 is shown in FIG. 5 in which portal disk assembly 22 is hinged into the top panel at latching orifice 18 and securely restrained by set screw 23 at the portal disk's opposite end. The portal disk is thus covering the entry aperture 24 shown in phantom which has been exposed with the removal of the knock-out cover. FIG. 5 similarly shows the standardized aperture opening 25 which has been fabricated into and through the portal disk device as well as grounding orifice 39. A sectional side view of the same juxtaposed positioning of the portal disk 22 juxtaposed against the surface of the top panel 19 of the range-hood assembly is shown in FIG. 6 in which off-set latch 35 has been inserted through hinging orifice 18 and set screw 23 has been used to secure the portal disk in the juxtaposed position.

Figure 7:
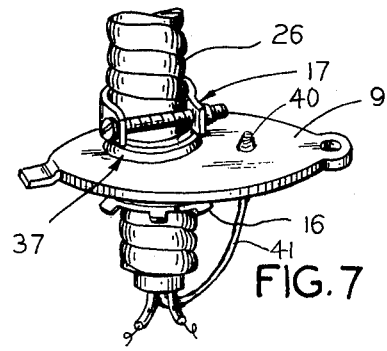
FIG. 7 is a perspective view of the portal disk-cable and connector unit, onto which the ground wire has been attached.

The portal disk-cable unit is shown in FIG. 7 in which cable 26 has been inserted through connector 37 and restrained in place in the connector through clamp 17 of the connecting device. The cable-connector portion is restrained in place onto portal disk 9 through the attachment and tightening of locknut 16 on the reverse side of the portal disk, sandwiching in the portal disk between the neck and locknut of the connector device. Additionally, ground wire 41 has been attached to the bottom of portal disk 9 by ground fastening means 40.

Figure 8:
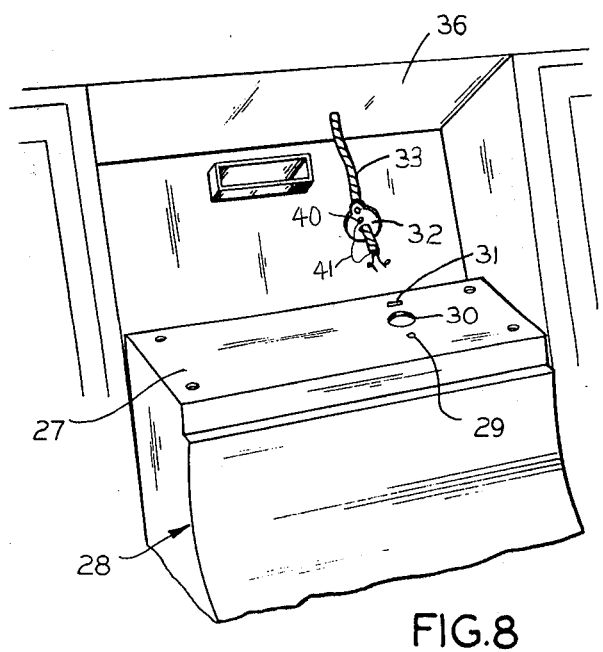
FIG. 8 is a perspective view showing the over-all installation of a range-hood incorporating the present electrical connecting arrangement.

The final installation procedure for accomplishing the means of electrical connection is schematically shown in FIG. 8 in which range-hood assembly 28 is being mounted to the surface of soffit 36. In this drawing, portal disk 32 and cable 33 will be installed as one unitized body through aperture 30 of the range-hood assembly. Creation of the unitized assembly is completed upon attachment of ground wire 41 to the bottom of portal disk 32 by ground fastening means 40. The unitized assembly will be securely hinged at latching orifice 31 and will be bolted down through a screwing device at screwing orifice 29. At this point, all but the final connection of exposed leads coming from the abode's electrical conducting means and from the range-hood's electrical conducting means have been made, allowing final attachment of range-hood assembly 28 juxtaposed to the surface of soffit 36. With the exposed cable leads now inside the range-hood assembly after the range-hood has been completely installed, it is but a simple task to connect, by tape or wire-nuts, the stripped ends of the abode's conducting means to the stripped ends of the range-hood assembly's conducting means, so as to provide a closed, safe, and grounded circuit through which electrical power can pass to the blower and lighting unit of the installed range-hood assembly.

The foregoing description and drawings merely explain and illustrate the invention and the invention is not limited thereto, except in so far as the appended claims are so limited, as those skilled in the art who have the disclosure before them will be able to make modifications and variations therein without departing from the scope of the invention.

I claim:

1. An electrical wiring arrangement for connecting suspendable fixture means to the power lines of the buildings in which they are suspended, said arrangement comprising:
   preliminary attachment means which are preliminarily coupled to the jackets of the power lines for subsequent attachment to said suspendable fixture;
   first aperture means through said preliminary attachment means for enabling the passage therethrough of said jacketed power lines;
   clamping means located proximate to said first aperture means for mechanically securing said jacketed power lines to said preliminary attachment means,
   connecting means substantially proximate to the periphery of said attachment means for connecting said preliminary attachment means to said suspendable fixture means, in a facilitated manner, whereby said jacketed power line is secured to suspendable fixture means, and
   second aperture means in said fixture means substantially aligned with said first aperture means in said preliminary attachment means to enable said jacketed wires to enter said fixture means for electrically connecting said fixture means wiring to said power lines.

2. The invention according to claim 1 in which the suspendable fixture means comprises a range-hood assembly.

3. The invention according to claim 2 in which said preliminary attachment means comprises a metallic portal disk,
   said portal disk having ground orifice means therein for enabling the attachment of a grounding means by ground fastening means; and
   said ground orifice means enabling metal-to-metal contact and electrical conductivity between said attachment means and said grounding means.

4. The invention according to claim 3 in which the first aperture means in said metallic portal disk for enabling the passage therethrough of said jacketed power lines comprises a substantially centered standard sized circular hole capable of accepting a standard diameter cable connecting device.

5. The invention according to claim 4 in which the clamping means for mechanically securing said jacketed power line to said portal disk comprises said standard cable connecting device having a threaded nipple means on a first end for insertion downwardly through said first aperture means,
   said cable connecting device restrained in position on said portal disk by a locknut,
   said cable connecting device having means at its second end to clamp down and entrap said power lines whereby said portal disk, said cable connecting device, and said power lines can be secured to said range-hood as a single unit.

6. The invention according to claim 5 in which said jacketed power lines comprises a flexible sheathed conduit encompassing the power leads of insulated wiring,
   said flexibly sheathed conduit emanating from and near the cooking area in which said range-hood will be installed so as to provide electrical power to run the blower and lighting units of said range-hood.

7. The invention according to claim 6 in which the connecting means for connecting said portal disk to said range-hood in a facilitated manner comprises,
   an off-set extended hinging latch protruding from a first side of said portal disk,
   a slotted latching orifice on said range-hood proximate to said second aperture means whereby said portal disk is inserted into said slotted latching orifice and can be pivotally rotated downwardly so as to be positioned juxtaposed to said range-hood in a flush surface mounting manner,
   a semi-circular appendage protruding from a second side of said portal disk,
   said second side being opposite to said first side,
   said semi-circular appendage having within it a first orifice so as to allow insertion of a disk fastening means through said first orifice, and
   a second orifice on said range-hood proximate to said second aperture means enabling final secure engagement of the portal disk to the range-hood through said disk fastening means.

8. The invention according to claim 7 in which the second aperture means in said range-hood, enabling said jacketed wires to enter said range-hood, comprises a fabricated circular aperture on the top panel of said range-hood assembly,
   said second aperture means covered by a fabricated knock-out means, and
   said second aperture means exposed upon removal of said knock-out means.

9. A method for connecting suspendable fixture means to the power lines of the buildings in which they are suspended comprising the steps of:
   a. securing a clamping means to preliminary attachment means,
   b. inserting said jacketed power lines into said clamping means,
   c. tightening the clamping means around said jacketed wires so as to fixedly secure said jacketed wires to said preliminary attachment means, and
   d. securing said preliminary attachment means to said suspendable fixture.

10. The method of claim 9 wherein securing said preliminary attachment means to said suspendable fixture comprises the steps of:
    a. inserting a protruding hinge portion of said jacketed power lines through a slotted orifice on said fixture,
    b. rotating said preliminary attachment means towards a flush surface position against said fixture, and
    c. securing said preliminary attachment means to said suspendable fixture by inserting fastening means through a first orifice on said attachment means and into a second orifice on said suspendable fixture.

11. The invention according to claim 7 in which said connecting means for connecting said portal disk to said range-hood in a facilitated manner, further comprises, slotted entry means in said semi-circular appendage connecting first said orifice with the outside periphery of said semi-circular appendage, thereby enabling the sliding of said disk fastening means into said first orifice after said disk fastening means has been preliminarily attached to said range-hood, said slotted entry means enabling secure attachment of said portal disk to said range-hood by sliding said semi-circular appendage under said disk fastening means after said portal disk, and said hinging latch are pivotally rotated downwardly so as to be positioned juxtaposed to said range-hood, and said semi-circular appendage is slidingly positioned behind said disk fastening means.

* * * * *